United States Patent
Ducharme

(10) Patent No.: US 7,836,193 B2
(45) Date of Patent: Nov. 16, 2010

(54) METHOD AND APPARATUS FOR PROVIDING GRAPHICAL OVERLAYS IN A MULTIMEDIA SYSTEM

(75) Inventor: Paul Ducharme, Scarborough (CA)

(73) Assignee: ViXS Systems, Inc., Toronto, Ontario (CA)

( * ) Notice: Subject to any disclaimer, the term of this patent is extended or adjusted under 35 U.S.C. 154(b) by 978 days.

(21) Appl. No.: 09/946,912

(22) Filed: Sep. 5, 2001

(65) Prior Publication Data

US 2002/0178278 A1    Nov. 28, 2002

Related U.S. Application Data

(63) Continuation-in-part of application No. 09/864,524, filed on May 24, 2001, now Pat. No. 7,099,951.

(51) Int. Cl.
G06F 15/16    (2006.01)
(52) U.S. Cl. .................... 709/231; 709/202; 709/246
(58) Field of Classification Search ........... 709/231, 709/246, 202; 725/37
See application file for complete search history.

(56) References Cited

U.S. PATENT DOCUMENTS

| | | | | |
|---|---|---|---|---|
| 5,585,858 A * | 12/1996 | Harper et al. | .................. | 348/485 |
| 6,147,714 A * | 11/2000 | Terasawa et al. | ............ | 348/564 |
| 6,205,582 B1 * | 3/2001 | Hoarty | ...................... | 725/93 |
| 6,310,886 B1 * | 10/2001 | Barton | ........................ | 370/462 |
| 6,345,388 B1 * | 2/2002 | Nishio et al. | ................ | 725/93 |
| 6,757,906 B1 * | 6/2004 | Look et al. | ...................... | 725/45 |
| 7,091,968 B1 * | 8/2006 | Ludvig et al. | .................. | 725/39 |
| 7,096,487 B1 * | 8/2006 | Gordon et al. | ................. | 725/91 |
| 2002/0078463 A1 * | 6/2002 | Foster | .......................... | 725/95 |
| 2002/0129374 A1 * | 9/2002 | Freeman et al. | ............... | 725/91 |

\* cited by examiner

Primary Examiner—Larry Donaghue
Assistant Examiner—Nicholas Taylor
(74) Attorney, Agent, or Firm—Garlick Harrison & Markison; Bruce E. Stuckman

(57) ABSTRACT

A method and apparatus for processing overlay data in a multimedia system include processing that begins when the server of the multimedia system selects a set of channels from a plurality of channels based on a set of channel select signals. The processing continues as the server converts the set of channels into streams of channel data. The server then decodes the streams of channel data into video frames for each channel of the set of channels. The processing continues as the server generates overlay data for at least one channel based on an overlay selection input, which is provided by the client that requested the particular channel. The processing then continues as the server encodes the overlay data with video frames of at least one channel to produce channel overlay packets. The processing continues as the server encodes the video frames of the other channels into sets of channels to produce channel packets. The server then provides the overlay packets and channel packets as a stream of packets of channel data to the clients of the system. Upon receipt, each client decodes the stream of packets of channel data to isolate its channel data. The client requesting overlay data decodes the overlay packets to retrieve the overlaid video frames using the same decoding process that the other clients used to retrieve the video data of their requested channels.

25 Claims, 5 Drawing Sheets

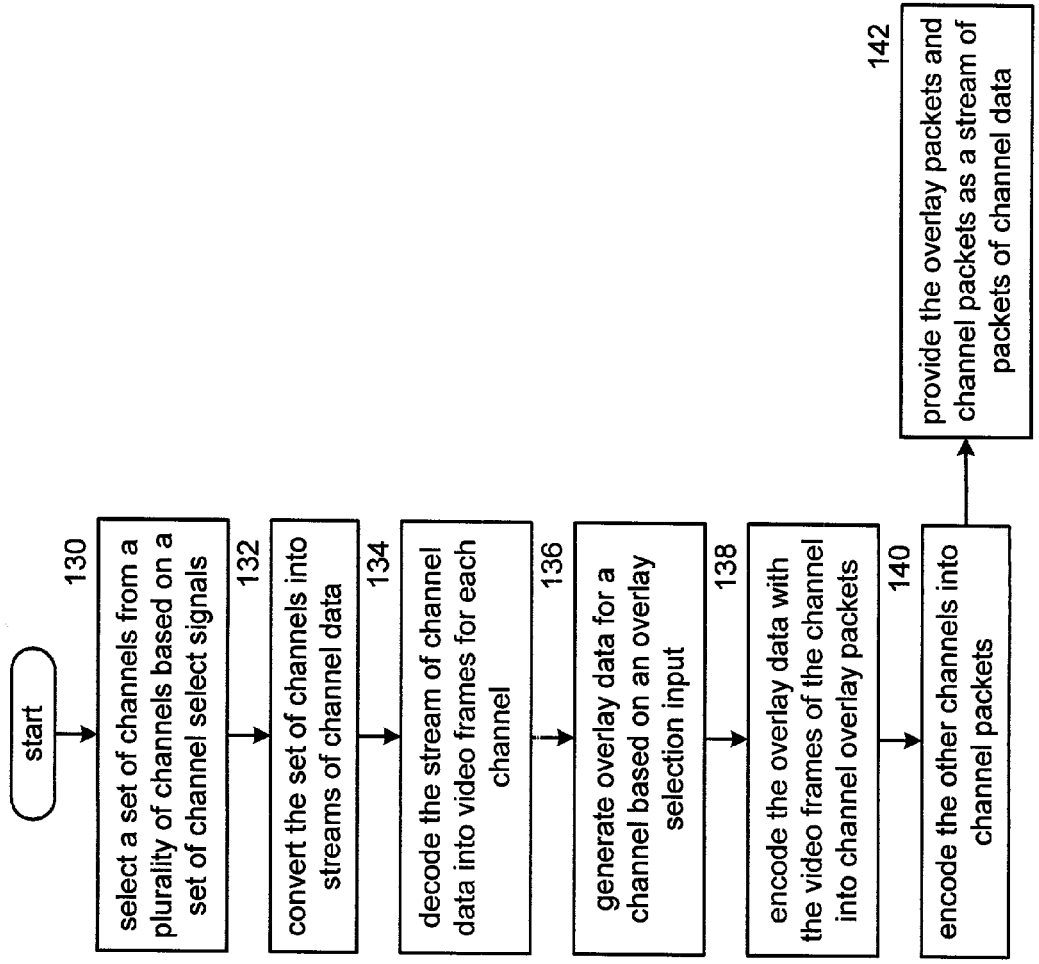

METHOD AND APPARATUS FOR PROVIDING GRAPHICAL OVERLAYS IN A MULTIMEDIA SYSTEM

This patent application is a continuation-in-part of patent application entitled METHOD AND APPARATUS FOR A MULTIMEDIA SYSTEM, having a filing date of: May 24, 2001 now U.S. Pat. No. 7,099,951, and a serial number of: Ser. No. 09/864,524.

TECHNICAL FIELD OF THE INVENTION

This invention relates generally to communication systems and more particularly to graphical processing within such communication systems.

BACKGROUND OF THE INVENTION

As is known, a home entertainment system may include a receiver, multiple television sets, computers, VCRs, DVD players, satellite receivers, cable receivers, set top boxes, etc. In such a system, each television set, computer, and other type of display devices includes video graphics circuitry that renders images (e.g., video and/or graphics), processes graphical overlays, and/or processes audio data.

To process overlays, the video graphics circuitry renders a frame of video data into a frame buffer. As the frame of data is being stored in the frame buffer, the video graphics circuitry interprets each pixel to determine whether the pixel is to include video data or overlay data. Overlay data includes two-dimensional and/or three-dimensional graphical images such as channel selection guide, channel number indications, commercial messages, etc. When the pixel is to include overlay data, the video graphics circuitry retrieves the overlay data from a texture map or graphical overlay memory.

As is also known, the retrieval of overlay data may further include scaling the overlay data to fit within a fixed sized window of the display. If the overlay data is scaled, the scaled data is stored in the frame buffer and subsequently displayed. Once of full frame of data (video and/or overlay data) is stored in the frame buffer, the video graphics circuitry provides the frame of data for display.

Accordingly, to process two-dimensional or three-dimensional overlay data, each television set, computer, monitor, and/or any other display device requires a significant amount of resources (e.g., main processor, memory, two-dimensional and/or three-dimensional graphics engine, etc.). Such resources are relatively expensive and, as such, are typically not included in "thin devices". A thin device is one that provides a minimal amount of audio/video features at a relatively low cost. Such thin devices include Televisions, DVD decoders, etc. While such thin devices are available, the marketplace is demanding higher performance from thin devices while maintaining their cost benefits.

Therefore, a need exists for a method and apparatus that allows thin client devices to offer greater audio and/or video features, including graphical overlays, with the resources previously required.

BRIEF DESCRIPTION OF THE DRAWINGS

FIG. 4 illustrates a schematic diagram of a multimedia server in accordance with the present invention;

FIG. 5 illustrates a logic diagram of a method for processing overlay data in accordance with the present invention;

DETAILED DESCRIPTION OF A PREFERRED EMBODIMENT

Generally, the present invention provides a method and apparatus for processing overlay data in a multimedia system. Such a method and apparatus include processing that begins when the server of the multimedia system selects a set of channels from a plurality of channels based on a set of channel select signals. For example, clients of a multimedia system provide channel selection requests to the server. The server selects the set of channels based on the channel selection requests provided by the clients. The processing continues as the server converts the set of channels into streams of channel data. The server then decodes the streams of channel data into video frames for each channel of the set of channels. The processing continues as the server generates overlay data for at least one channel of the set of channels based on an overlay selection input, which is provided by the client that requested the particular channel. The processing then continues as the server encodes the overlay data with video frames of at least one channel to produce channel overlay packets. The processing continues as the server encodes the video frames of the other channels in set of channels to produce channel packets. The server then provides the overlay packets and channel packets as a stream of packets of channel data to the clients of the system. Upon receipt, each client decodes the stream of packets of channel data to isolate its channel data. The client requesting overlay data decodes the overlay packets to retrieve the overlaid video frames using the same decoding process that the other clients used to retrieve the video data of their requested channels. With such a method and apparatus, expensive video graphics processing may be performed in a server of a multimedia system and encoding prior to transmission to the clients. As such, each client only requires a decoder to produce specially processed video data, including graphical overlays embedded within the Video Data. For example, the output is a MPEG compressed stream comprising the original video overlay with a Graphic Image that is re-encoded as MPEG video PES packets referred to herein as "packets".

Figure 1:
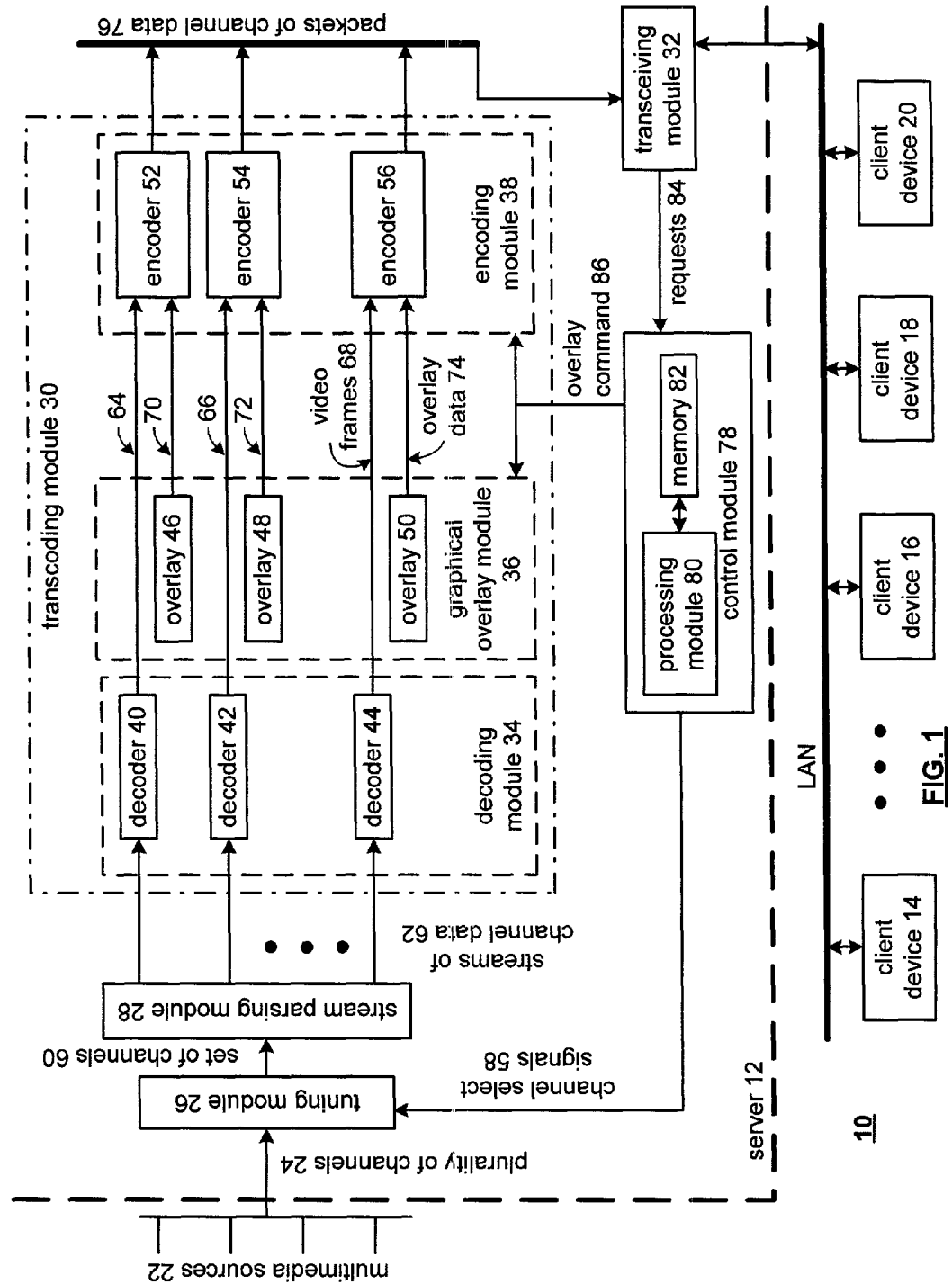
FIG. 1 illustrates a logic diagram of a multimedia system in accordance with the present invention.

The present invention can be more fully described with reference to FIGS. 1-7. FIG. 1 illustrates a schematic block diagram of a multimedia system 10 that includes a server 12, a plurality of client devices 14-20, and a plurality of multimedia sources 22. Such a client device may be a personal digital assistant, a personal computer, a monitor (e.g., LCD monitor, flat panel monitor, CRT monitor, et cetera and may include speakers, or speaker connections, et cetera), a television set, high definition television (HDTV), standard definition television (SDTV), a home theatre system, laptop computer, et cetera.

Each of the client devices 14-20 includes a decoder and input circuitry. The decoder is the compliment of the encoders 52-56 used in the server. For example, the encoding/decoding may be done in accordance with any one of the MPEG standards, MJPEG, JPEG, etc. The input circuitry may be, but is not limited to, a keyboard, remote control device, touch screen, voice command circuitry, keypad, and/or joystick. In addition, each of the client devices 14-20 is operably coupled to the server via a wireless or wired local area network (LAN) and includes an appropriate network-interfacing card. For example, the client devices may include a wireless network card in accordance with the 802.11 standard or an Ethernet network card, etc.

The server 12 includes a tuning module 26, stream parsing module 28, a transcoding module 30, transceiving module 32, and a control module 78. The transcoding module 30 includes a decoding module 34, graphical overlay module 36, and an encoding module 38. The decoding module 34 includes a plurality of decoders 40-44. The graphical overlay module 36 includes a plurality of overlay modules 46-50. The encoding module 38 includes a plurality of encoding modules 52-56. The control module 78 includes a processing module 80 and memory 82. The processing module 80 may be a single processing device or a plurality of processing devices. Such a processing device may be a microcontroller, microprocessor, microcomputer, central processing unit, digital signal processor, programmable gate array, state machine, logic circuitry, and/or any device that manipulates signals (analog and/or digital) based on operational instructions. The memory 82 may be a single memory device or a plurality of memory devices. Such a memory device may be a read-only memory, random access memory, system memory, flash memory, magnetic tape memory, programmable memory, erasable memory, and/or any device that stores digital information. Note that when the processing module 80 implements one or more of its functions via a state machine or logic circuitry, the memory 82 storing the corresponding instructions is embedded within the circuitry comprising the state machine or logic circuitry. The processing module 80 performs one or more of the processing steps illustrated in the logic diagrams of FIGS. 5-7, which will be discussed below.

In operation, the server 12 receives a plurality of channels 24 from a plurality of multimedia sources 22. The multimedia sources 22 may be a satellite connection, cable connection, antenna connection for NTSC television broadcast, HDTV broadcast, PAL broadcast, VCR player/recorder, DVD player, et cetera. Accordingly, the plurality of channels 24 may be programs received by a satellite receiver, set top box receiver, output of a DVD player, etc. The tuning module 26 selects one or more channels from the plurality of channels 24 based on channel select signals 58 to produce a set of channels 60. The channel select signals are received as requests 84 from at least some of the client devices and each channel select signal indicates a particular channel that a user of a client device desires to view. A detailed discussion of the construct and functioning of the tuning module 26 is found in the co-pending parent patent application entitled METHOD AND APPARATUS FOR A MULTIMEDIA SYSTEM.

The stream parsing module 28 receives the set of channels 60 and separates the set of channels into streams of channel data 62. The stream parsing module 28 provides the separate streams of channel data 62 to the decoding module 34 of the transcoding module 30. A detailed discussion of the construct and functioning of the stream parsing module 28 is found in the co-pending parent patent application entitled METHOD AND APPARATUS FOR A MULTIMEDIA SYSTEM.

Each decoder 40-44 of the decoding module 34 decodes one of the streams of channel data 62 to produce video frames of the channel. For example, decoder 40 decodes a first stream of channel data into video frames 64, decoder 42 decodes a second stream of channel data into video frames 66, and decoder 44 decodes a $n^{th}$ stream of channel data into video frames 68. Each of the decoders 40-44 may be an MPEG decoder operably coupled to decode the stream of channel data into MPEG video frames for each channel of the set of channels. As one of average skill in the art will appreciate, decoding module 34 may further include audio decoding circuitry, such an MP3 decoder, MPEG audio decoding, DVD audio decoder, and/or CD decoder. The decoding module 34 provides the video frames 64, 66, and 68 of each separate channel to the encoding module 38.

Each overlay module 46-50 of the graphical overlay module 36 receives an overlay command 86 from the clients via the control module 78 and produces overlay data 70, 72, or 74. The overlay command 86 indicates whether an overlay is to be processed for a given channel, the graphical data to be overlaid, size of the graphical overlay, color data, texture map coordinates, and/or any information to enable a graphical overlay of video frames of a channel. Each overlay module 46-50 may be implemented via a separate video graphics processor, or as virtual graphics processor of a video graphics circuit. The functionality of a video graphics processor is known as used in personal computers, laptop computers, television sets, monitors, etc. Thus, no further discussion will be presented except to illustrate the concepts of the present invention.

The encoding module 38 receives the video frames 64, 66, and 68 for the separate channels and also receives the overlay data 70, 72, and/or 74 for each of the separate channels. As one of average skill in the art will appreciate, each channel may or may not be overlaid with two-dimensional and/or three-dimensional graphical data. Such graphical data includes, but is not limited to, volume sliders, channel indicators, electronic program guide, onscreen menus, translucent images, subtitles, games, web server applications, and/or motion vectors that direct a motion vector search algorithm of the encoder to retrieve the overlay data, and any other applications that involve the display of graphical objects.

Each encoder 52-56 encodes the graphical data 70-74, if enabled for the given channel, along with each of the video frames 64-68 to produce packets of channel data 76. Such encoders 52-56 may be an MPEG encoder, JPEG encoder, MJPEG encoder, and/or any other type of video encoding. The encoders 52-56 encode the overlay data and the video frames in accordance with the overlay commands 86. The overlay commands 86 indicate whether a video frame is to be overlaid with overlay data and where in the video frame the overlay data is to be placed. As such, an encoder 52-56 encodes a video frame into packets of channel data until the overlay command indicates that overlay data is to be encoded.

The transceiving module 32 receives the packets of channel data 76 and provides the packets to the plurality of client devices 14-20 via the LAN connection. Each client monitors the LAN connection to extract packets that are addressed to it. Using the decoder, each client decodes the packets to recapture the video data, which may include an overlay. As such, expensive video graphics processing is performed by the server of a multimedia system and encoding prior to transmission to the clients. Accordingly, each client only requires a decoder to produce specially processed video data, including graphical overlays.

The transceiving module 32 also receives packets of input data from the clients via the LAN connection. Such inputs include selection of a channel from one of the plurality of channels 24, selection of an overlay, input responses to a menu, etc. The transceiving module 32 decodes the packets and provides the inputs to the control module 78. The control module 78 processes the inputs to produce channel select signals 58 and/or overlay commands 86. The operation of the multimedia system 10 is further described in co-pending parent patent application entitled METHOD AND APPARATUS FOR A MULTIMEDIA SYSTEM.

Figure 2:
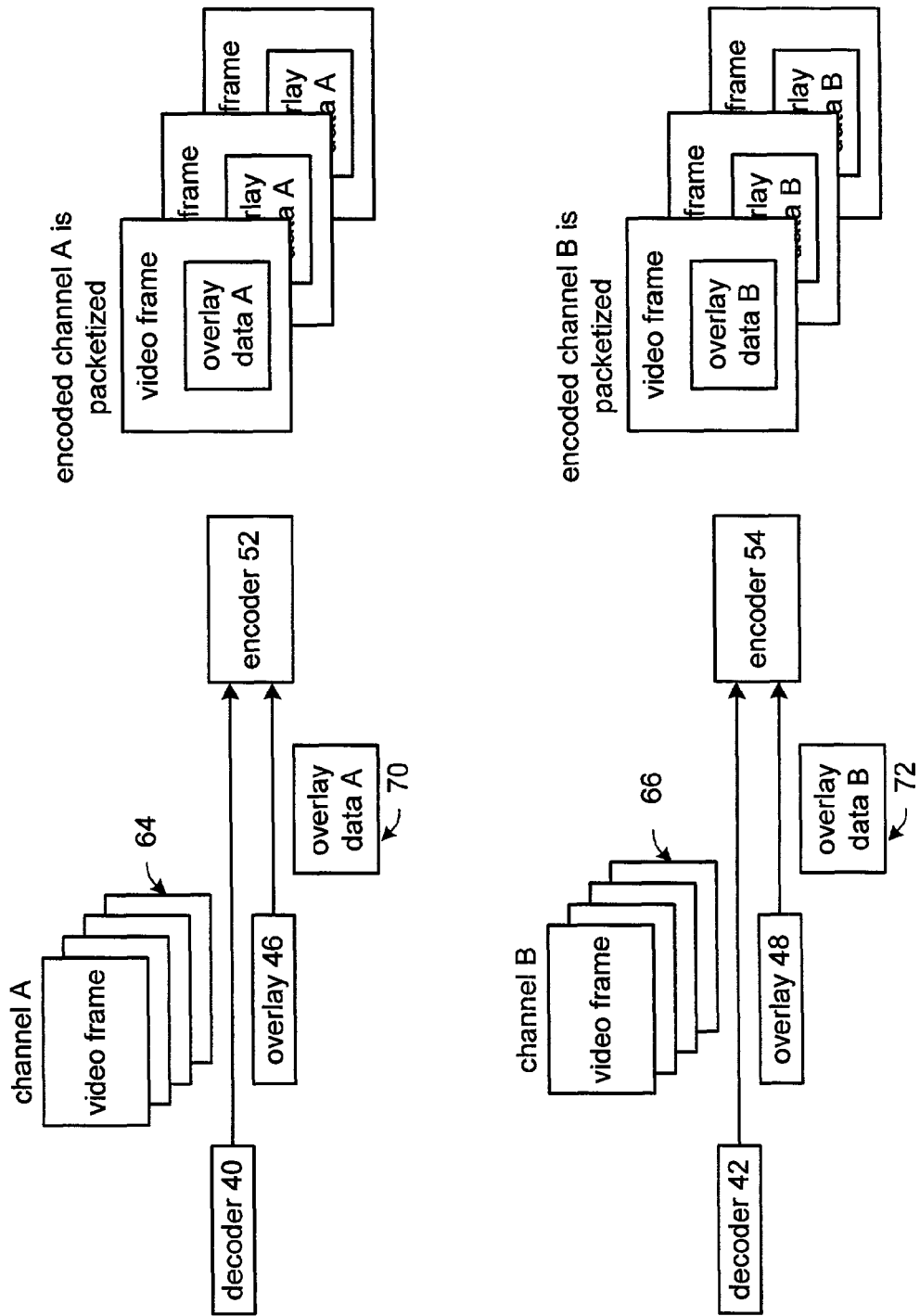
FIG. 2 illustrates a graphical diagram of providing graphical overlays in accordance with the present invention.

FIG. 2 illustrates a graphical representation of transcoding module 30 encoding the video frames and overlay data. As shown, decoder 40 produces a plurality of video frames 64 for channel A from a separate stream of channel data. The decoder 40 provides the video frames 64 to the encoder 52. The overlay module 46 generates overlay data A 70 and provides the overlay data A to the encoder 52. The encoder 52 encodes the overlay data A and the video frames of Channel A into packets of encoded Channel A data. As shown, the packets of Channel A include a plurality of video frames, each of which includes overlay data A in a window of the video frames.

As is also shown, decoder 42 produces a plurality of video frames 66 for channel B from a separate stream of channel data. The decoder 42 provides the video frames 66 to the encoder 54. The overlay module 48 generates overlay data B 72 and provides the overlay data B to the encoder 54. The encoder 54 encodes the overlay data B and the video frames of Channel A into packets of encoded Channel B data. As shown, the packets of Channel B include a plurality of video frames, each of which includes overlay data B in a window of the video frames. As one of average skill in the art will appreciate, the above mentioned Encoding/Decoding refers to MPEG decode and encode within the digital domain.

Figure 3:
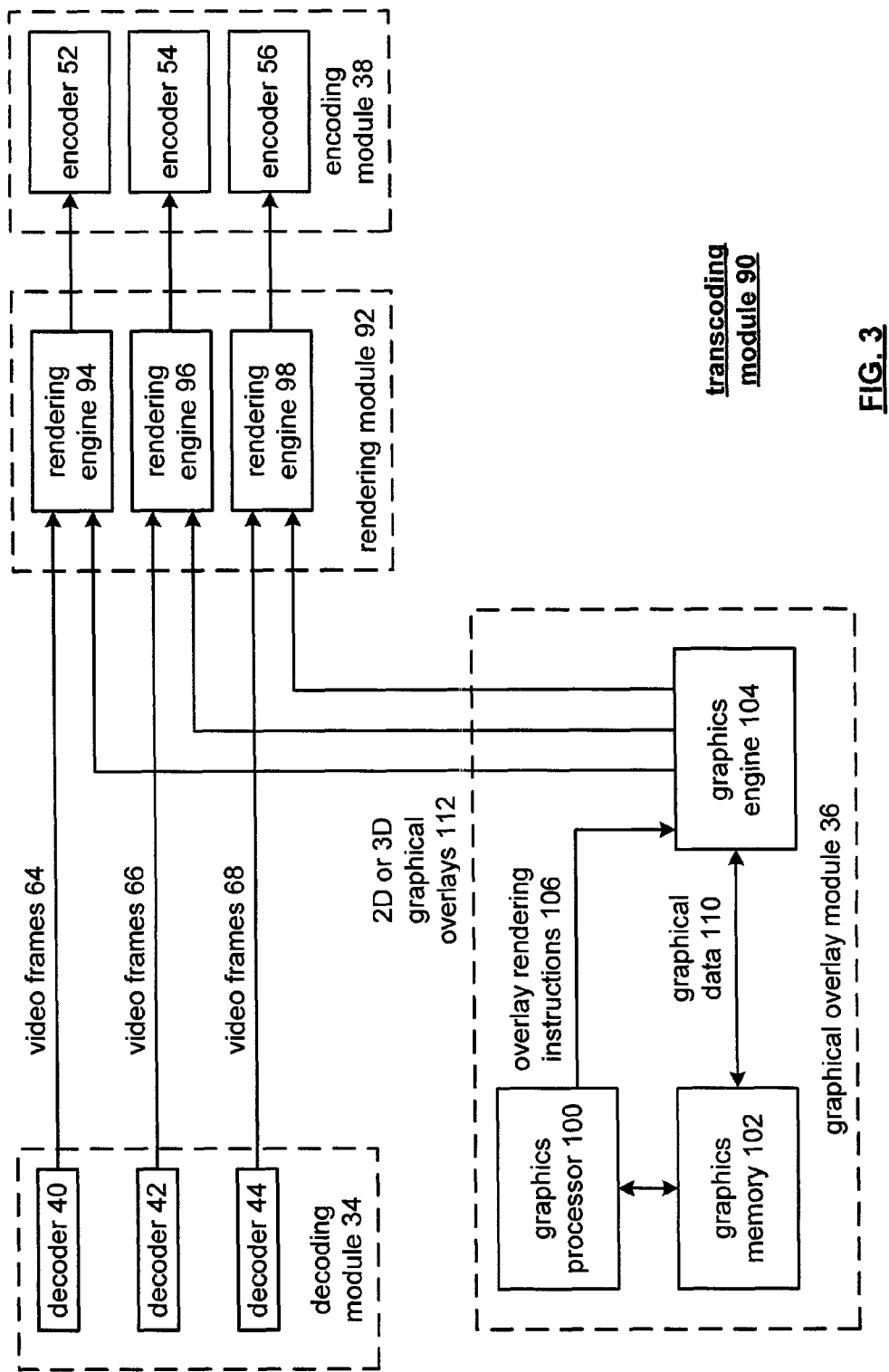
FIG. 3 illustrates a schematic diagram of a transcoding module in accordance with the present invention.

FIG. 3 illustrates a schematic block diagram of an alternate transcoding module 90 for use in server 12. The transcoding module 90 includes the decoding module 34, the graphical overlay module 36, a rendering module 92, and the encoding module 38. The decoding module 34 includes a plurality of decoders 40-44, which decode streams of channel data into video frames 64-68. The decoding module 34 provides the video frames 64-68 to the rendering module 92.

The graphical overlay module 36 includes a graphics processor 100, graphics memory 102, and a graphics engine 104. The graphics processor 100 generates overlay rendering instructions 106 based on the overlay commands 86. The rendering instructions 106 include texture map information, texture map coordinates, color data information, display coordinates, etc. The graphics memory 102 stores graphical data 110, texture maps, etc., which is provided to the graphics engine 104. The graphics engine 104 processes the graphical data 110 based on the overlay rendering instructions 106 to produce two-dimensional and/or three-dimensional graphical overlays 112 for one or more of the channels. The functionality of the graphics processor 100 and graphics engine 104 is known, thus no further discussion will be presented except to further illustrate the concepts of the present invention.

The rendering module 92 receives the video frames 64-68 and the separate graphical data 112 via rendering engines 94-98. Each of the rendering engines 94-98 render frames of data from the video frames 64-68 and the graphical overlays 112. The rendered frames are provided to the encoding module 38, which encodes the frames into packets of channel data 76 via encoders 52-56.

FIG. 4 illustrates a schematic block diagram of a multimedia server 120, which includes a processing module 122 and memory 124. The processing module 122 may be a single processing device or a plurality of processing devices. Such a processing device may be a microcontroller, microprocessor, microcomputer, central processing unit, digital signal processor, programmable gate array, state machine, logic circuitry, and/or any device that manipulates signals (analog and/or digital) based on operational instructions. The memory 124 may be a single memory device or a plurality of memory devices. Such a memory device may be a read-only memory, random access memory, system memory, flash memory, magnetic tape memory, programmable memory, erasable memory, and/or any device that stores digital information. Note that when the processing module 122 implements one or more of its functions via a state machine or logic circuitry, the memory 124 storing the corresponding instructions is embedded within the circuitry comprising the state machine or logic circuitry. The processing module 122 performs one or more of the processing steps illustrated in the logic diagrams of FIGS. 5-7, which will be discussed below.

FIG. 5 illustrates a logic diagram of a method for processing overlay data in a multimedia system. The process begins at step 130 where the server selects a set of channels from a plurality of channels based on a set of channel select signals. The server receives channel select requests from the plurality of clients and generates, therefrom, the channel select signals. The channel select signals indicate which of the plurality of channels are to be selected and included in the set of channels. The processing continues at step 132 where the server converts the set of channels into streams of channel data. Such a conversion was previously discussed with reference to FIG. 1.

The process proceeds to step 134 where the server decodes the streams of channel data into video frames for each channel of the set of channels. The process then proceeds to step 136 where the server generates overlay data for at least one channel of the set of channels based on an overlay selection input. The generation of the overlay data may be done by generating overlay rendering instructions based on the overlay selection input and generating two dimensional and/or three dimensional graphical overlays from graphics data based on the overlay rendering instructions.

The process then proceeds to step 138 where the server encodes the overlay data with at least a portion of each of the video frames of at least one channel of set of channels into channel overlay packets. In other words, the server encodes overlay data with the video frames of each channel for which overlays has been activated. The process then proceeds to step 140 where the server encodes at least one channel of the set of channels into channel packets. In other words, the server encodes the video frames of each channel for which an overlay has not been activated.

The process then proceeds to step 142 where the server provides the overlay packets and channel packets as a stream of packets of channel data. In addition to providing the packets to the clients, the server may also receive input requests from the plurality of clients. The input requests include selection of the particular overlay data, modify an overlay, respond to the overlay, etc. Further, the server may generate audio overlay data based on an audio overlay selection input. The server would then encoded the audio overlay data with at least a portion of the audio of each of the video frames of the channel.

Figure 6:
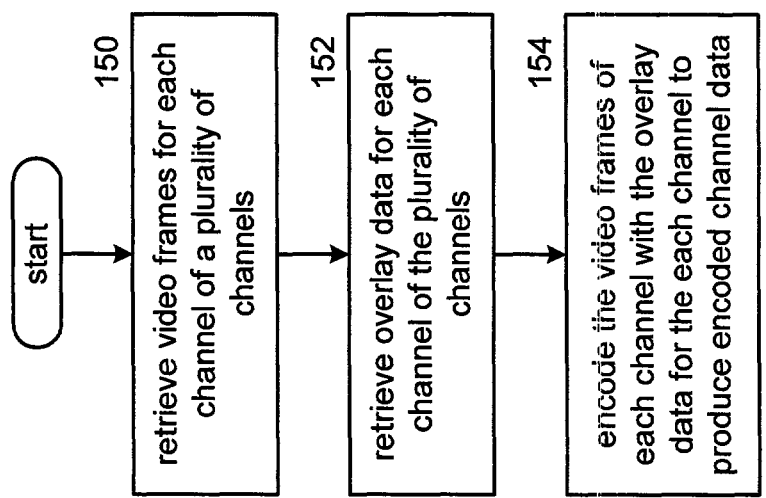
FIG. 6 illustrates a logic diagram of a method for transcoding data in accordance with the present invention.

FIG. 6 illustrates a logic diagram of a method for transcoding data within a server of a multimedia system. The process begins at step 150 where the server retrieves video frames for each channel of a plurality of channels. The process then proceeds to step 152 where the server retrieves overlay data for each channel of the plurality of channels. This may be done by selecting the overlay data for each channel of the plurality of channels based on a corresponding one of a plurality of overlay selection inputs. The overlay data may be graphical images for at least one of: electronic program guide, subtitles, menus, games, web server applications, or motion vectors that direct motion vector search algorithm of the encoder.

The processing continues at step 154 where the server encodes the video frames of each channel of the plurality of channels with the overlay data for the each channel of the plurality of channels to produce encoded channel data. The encoding may be done by MPEG encoding the video frames of at least one of the plurality of channels.

Figure 7:
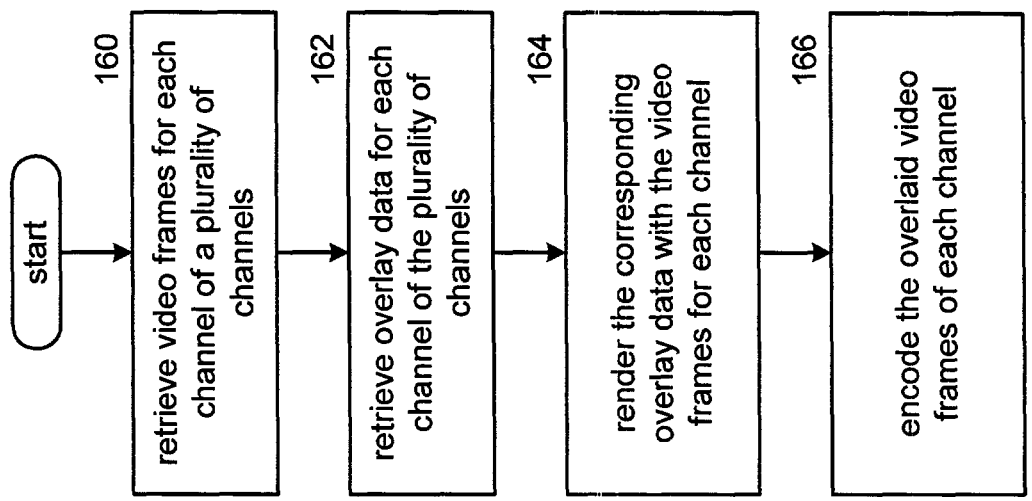
FIG. 7 illustrates a logic diagram of an alternate method for transcoding data in accordance with the present invention.

FIG. 7 illustrates a logic diagram of a method for transcoding data within a server of a multimedia system. The processing begins at step 160 where the server retrieves video frames for each channel of a plurality of channels. The processing then proceeds to step 162 where the server retrieves overlay data for each channel of the plurality of channels. This may be done by selecting the overlay data for each channel of the plurality channels based on a corresponding one of a plurality of overlay selection inputs.

The process then proceeds to step 164 where the server renders the corresponding overlay data with the video frames for each channel of the plurality of channels to produce overlaid video frames for each channel of the plurality of channels. The process then proceeds to step 166 where the server encodes the overlaid video frames of the each channel of the plurality of channels to produce encoded channel data. The encoding may be done by MPEG encoding the video frames of the each channel of the plurality of channels.

The preceding discussion has presented a method and apparatus for providing specialty graphical operations in a multimedia system, including graphical overlays. By processing the graphical data prior to encoding, the server provides the graphic overlay processing, thus the client devices only need a decoding function to recapture graphically overlaid video data. As one of average skill in the art will appreciate, other embodiments may be derived from the teachings of the present invention without deviating from the scope of the claims. As one of average skill in the art will further appreciate, the video may also be scaled/offset thus allowing for support of picture in picture combinations with, the overlays may be of varying opacity i.e. opaque, semi-transparent, etc., and Note : the Video and Graphical overlays may be alpha blended prior to being encoded.

What is claimed is:

1. A server for use in a multimedia system, the server comprises:
   tuning module operably coupled to select a set of channels from a plurality of channels based on a set of channel select signals that indicate channel selection requests from a plurality of clients;
   stream parsing module operably coupled to convert the set of channels into streams of channel data; and
   transcoding module operably coupled to packetize the streams of channel data and overlay data into packets of channel data, wherein the transcoding module includes:
      decoding module operably coupled to decode the streams of channel data into decoded video frames for each channel of the set of channels;
      graphical overlay module operably coupled to generate overlay data for at least one channel of the set of channels based on an overlay selection input corresponding to at least one of the plurality of clients, the overlay selection input indicating one of a plurality of overlay types; and
      encoder operably coupled to re-encode the overlay data with at least a portion of each of the decoded video frames of the at least one channel of set of channels and to re-encode, contemporaneously, the decoded video frames of the set of channels less the at least one channel of the set of channels to produce the packets of channel data.

2. The server of claim 1, wherein the decoding module further comprises:
   MPEG decoder operably coupled to decode the stream of channel data from MPEG format for each channel of the set of channels.

3. The server of claim 2, wherein the encoding module further comprises:
   MPEG encoder operably coupled to encode the overlay data with the at least a portion of each of the decoded video frames of at least one of set of channels and to re-encode the decoded video frames of the set of channels less the at least one of the set of channels to produce the packets of channel data in MPEG format.

4. The server of claim 1, wherein the graphical overlay module further comprises:
   graphics processor operably coupled to generate overlay rendering instructions based on the overlay selection input;
   graphics memory operably coupled to the graphics processor, wherein the memory stores graphics data; and
   graphics engine operably coupled to the graphics processor and the graphics memory, wherein the graphics engine generates two dimensional or three dimensional graphical overlays from the graphics data based on the overlay rendering instructions to produce the overlay data.

5. The server of claim 1 further comprises:
   control module operably coupled to the tuning module and the transcoding module, wherein the control module includes a processing module and memory, wherein the memory stores operational instructions that cause the processing module to generate channel selection commands from the channel selection requests and to provide the channel selection commands to the tuning module, wherein the tuning module selects at least one channel of the set of channels per each of the channel selection commands, wherein the memory further includes operational instructions that cause the processing module to generate an overlay command from the overlay selection input, wherein the control module provides the overlay command to the encoding module such that the encoding module encodes the overlay data with the at least a portion of the decoded video frames of the at least one channel of the set of channels.

6. The server of claim 5, wherein the memory of control further comprises operational instructions that cause the processing module to:
   generate a set of overlay commands from a set of overlay requests, wherein each of the set of overlay requests corresponds to an individual channel of the set of channels;
   provide the set of overlay commands to the graphics overlay module, wherein the graphics overlay module generates a set of overlay data that corresponds to the set of overlay commands; and
   provide the set of overlay commands to the encoder such that the encoder re-encodes corresponding overlay data of the set of overlay data with the decoded video frames of a channel of the set of channels.

7. The server of claim 6, wherein the overlay data further comprises:
   graphical images for at least one of: electronic program guide, subtitles, menus, games, and web server applications; and
   motion vectors that direct motion vector search algorithm of the encoder.

8. The server of claim 1, wherein the transcoding module further comprises:

rendering module operably coupled to receive the overlay data and the video frames of the at least one channel of the set of channels, wherein the rendering module renders the overlay data with each of the decoded video frames of the at least one channel of the set of channels into a series of overlaid frames, wherein the rendering module provides the overlaid frames to the encoding module such that the encoding module re-encodes the overlaid frames into the packets of channel data.

9. The server of claim 1 further comprises:
transceiving module operably coupled to transmit the packets of channel data to a plurality of clients and operably coupled to receive input requests from the plurality of clients, wherein the input requests include the overlay selection input.

10. The server of claim 9, wherein the input requests further comprise:
modify requests that are based on user inputs to the plurality of clients, wherein the transceiving module receives the modify requests and provides the modify requests to the transcoding module, wherein the graphical overlay module modifies the overlay data based on the modify requests.

11. The server of claim 1, wherein the transcoding module further comprises:
audio overlay module operably coupled to generate audio overlay data based on an audio overlay selection input, wherein the audio overlay module provides the audio overlay data to the encoding module such that the encoding encodes the audio overlay data with at least a portion of audio associated with each of the decoded video frames of the at least one channel of the set of channels.

12. A method for processing overlay data in a multimedia system, the method comprises:
selecting a set of channels from a plurality of channels based on a set of channel select signals that indicate channel selection requests from a plurality of clients;
converting the set of channels into streams of channel data;
decoding the streams of channel data into decoded video frames for each channel of the set of channels;
generating overlay data for at least one channel of the set of channels based on an overlay selection input corresponding to at least one of the plurality of clients, the overlay selection input indicating one of a plurality of overlay types;
encoding the overlay data with at least a portion of each of the decoded video frames of the at least one channel of set of channels into channel overlay packets;
encoding the decoded video frames of the set of channels less the at least one channel of the set of channels into channel packets; and
transmitting the overlay packets and channel packets as a stream of packets of channel data.

13. The method of claim 12, wherein the generating the overlay data further comprises:
generating overlay rendering instructions based on the overlay selection input; and
generating two dimensional or three dimensional graphical overlays from graphics data based on the overlay rendering instructions to produce the overlay data.

14. The method of claim 12 further comprises:
generating channel selection commands from the channel selection requests;
selecting at least one channel of the set of channels per each of channel selection commands;
generating an overlay command from the overlay selection input; and
encoding the overlay data with the at least a portion of the decoded video frames of the at least one channel of the set of channels in accordance with the overlay command.

15. The method of claim 14 further comprises:
generating a set of overlay commands from a set of overlay requests, wherein each of the set of overlay requests corresponds to an individual channel of the set of channels;
generating a set of overlay data that corresponds to the set of overlay commands in accordance with the set of overlay commands; and
encoding corresponding overlay data of the set of overlay data with the decoded video frames of a channel of the set of channels in accordance with the set of overlay commands.

16. The method of claim 12 further comprises:
transmitting the packets of channel data to a plurality of clients; and
receiving input requests from the plurality of clients, wherein the input requests include the overlay selection input.

17. The method of claim 16 further comprises:
receiving a modify request as at least one of the input requests; and
modifying the overlay data based on the modify request.

18. The method of claim 12 further comprises:
generating audio overlay data based on an audio overlay selection input; and
encoding the audio overlay data with at least a portion of audio associated with each of the video frames of the at least one channel of the set of channels.

19. An apparatus for processing overlay data in a multimedia system, the apparatus comprises:
processing module; and
memory operably coupled to the processing module, wherein the memory includes operational instructions that cause the processing module to:
select a set of channels from a plurality of channels based on a set of channel select signals that indicate channel selection requests from a plurality of clients;
convert the set of channels into a stream of channel data;
decode the stream of channel data into decoded video frames for each channel of the set of channels;
generate overlay data for at least one channel of the set of channels based on an overlay selection input corresponding to at least one of the plurality of clients, the overlay selection input indicating one of a plurality of overlay types;
encode the overlay data with at least a portion of each of the decoded video frames of the at least one channel of set of channels into channel overlay packets;
encode the decoded video frames of the set of channels less the at least one channel of the set of channels into channel packets; and
transmit the overlay packets and channel packets as a stream of packets of channel data.

20. The apparatus of claim 19, wherein the memory further comprises operational instructions that cause the processing module to generate the overlay data by:
generating overlay rendering instructions based on the overlay selection input; and
generating two dimensional or three dimensional graphical overlays from graphics data based on the overlay rendering instructions to produce the overlay data.

21. The apparatus of claim 19, wherein the memory further comprises operational instructions that cause the processing module to:

generate channel selection commands from the channel selection requests;

select at least one channel of the set of channels per each of channel selection commands;

generate an overlay command from the overlay selection input; and encode the overlay data with the at least a portion of the decoded video frames of the at least one channel of the set of channels in accordance with the overlay command.

22. The apparatus of claim 21, wherein the memory further comprises operational instructions that cause the processing module to:

generate a set of overlay commands from a set of overlay requests, wherein each of the set of overlay requests corresponds to an individual channel of the set of channels;

generate a set of overlay data that corresponds to the set of overlay commands in accordance with the set of overlay commands; and encode corresponding overlay data of the set of overlay data with the decoded video frames of a channel of the set of channels in accordance with the set of overlay commands.

23. The apparatus of claim 19, wherein the memory further comprises operational instructions that cause the processing module to:

transmit the packets of channel data to a plurality of clients; and receive input requests from the plurality of clients, wherein the input requests include the overlay selection input.

24. The apparatus of claim 23, wherein the memory further comprises operational instructions that cause the processing module to:

receive a modify request as at least one of the input requests; and modify the overlay data based on the modify request.

25. The apparatus of claim 19, wherein the memory further comprises operational instructions that cause the processing module to:

generate audio overlay data based on an audio overlay selection input; and encode the audio overlay data with at least a portion of audio associated with each of the video frames of the at least one channel of the set of channels.

* * * * *